US012602664B2

(12) United States Patent
Maikhuri et al.

(10) Patent No.: US 12,602,664 B2
(45) Date of Patent: Apr. 14, 2026

(54) INTELLIGENT MEETING TIMESLOT ANALYSIS AND RECOMMENDATION

(71) Applicant: Dell Products L.P., Round Rock, TX (US)

(72) Inventors: Ajay Maikhuri, Bangalore (IN); Dhilip Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 18/183,346

(22) Filed: Mar. 14, 2023

(65) Prior Publication Data

US 2024/0311773 A1 Sep. 19, 2024

(51) Int. Cl.
*G06Q 10/10* (2023.01)
*G06Q 10/1093* (2023.01)

(52) U.S. Cl.
CPC ................................ *G06Q 10/1093* (2013.01)

(58) Field of Classification Search
CPC ...................................................... G06Q 10/10
See application file for complete search history.

(56) References Cited

U.S. PATENT DOCUMENTS

| | | | | |
|---|---|---|---|---|
| 2018/0189743 | A1* | 7/2018 | Balasubramanian .. | G06N 5/025 |
| 2019/0334907 | A1* | 10/2019 | Rodden ................... | H04L 67/54 |
| 2021/0319408 | A1* | 10/2021 | Jorasch ............... | H04L 12/1827 |
| 2021/0399911 | A1* | 12/2021 | Jorasch ............... | H04L 12/1818 |
| 2022/0343250 | A1* | 10/2022 | Tremblay ........... | G06Q 10/0633 |

| | | | | |
|---|---|---|---|---|
| 2022/0383265 | A1* | 12/2022 | Dhumal ................ | G06F 40/216 |
| 2023/0153546 | A1* | 5/2023 | Peleg ................... | G06F 3/04847 |
| | | | | 704/9 |
| 2023/0297969 | A1* | 9/2023 | Liu .................... | G06Q 10/1095 |
| | | | | 705/7.19 |

FOREIGN PATENT DOCUMENTS

WO WO-2015066483 A1 * 5/2015 ......... G06Q 10/1095

OTHER PUBLICATIONS

Shreshth Tuli , Giuliano Casale , and Nicholas R. Jennings, MCDS: AI Augmented Workflow Scheduling in Mobile Edge Cloud Computing Systems, IEEE Transactions on Parallel and Distributed Systems, vol. 33, No. 11, Nov. 2022. (Year: 2022).*

* cited by examiner

*Primary Examiner* — Kurtis Gills
(74) *Attorney, Agent, or Firm* — DALY, CROWLEY, MOFFORD & DURKEE, LLP

(57) ABSTRACT

An example methodology includes receiving a request to analyze a timeslot of a meeting and determining meeting details, wherein the meeting details include an organizer of the meeting, a date of the meeting, a time of the meeting, a subject of the meeting, and one or more attendees of the meeting. The method also includes predicting, using a machine learning model, an attendee meeting acceptance level for each attendee of the one or more attendees. The method further includes determining an acceptance level of the meeting based on likelihood of the one or more attendees joining the meeting, wherein the likelihood of the one or more attendees joining the meeting is based at least on the predicted attendee meeting acceptance levels for the one or more attendees, and sending information about the acceptance level of the meeting in a response to the request to analyze the timeslot of the meeting.

20 Claims, 9 Drawing Sheets

| | Meeting Tracking | | 502 | 504 | 500 |
|---|---|---|---|---|---|
| Date | Time | Meeting | Status | | |
| 25 April 2022 | 2:00pm to 2:30 pm | Meeting: Project Priority | | View Details | |
| | 2:30pm to 3:30 pm | Meeting: Stack Holder Priority | | View Details | |
| | 4:00pm to 5:00 pm | Meeting: Status Meeting | | View Details | |
| | 5:30pm to 6:30 pm | Meeting: Tex - Schedule | | View Details | |
| 26 April 2022 | 2:00pm to 2:30 pm | Meeting: Moon Shot – Solution - 1 | | View Details | |
| | 2:30pm to 3:30 pm | Meeting: Staff Meeting | | View Details | |
| | 4:00pm to 5:00 pm | Meeting: Sprint Planning | | View Details | |
| | 5:30pm to 6:30 pm | Meeting: Environment Readiness | | View Details | |
| 27 April 2022 | 2:00pm to 2:30 pm | Meeting: Leadership Prep Session | | View Details | |
| | 2:30pm to 3:30 pm | Meeting: Hackathon Schedule | | View Details | |
| | 4:00pm to 5:00 pm | Meeting: Project Priority | | View Details | |
| | 5:30pm to 6:30 pm | Meeting: Status Meeting | | View Details | |
| 28 April 2022 | 2:00pm to 2:30 pm | Meeting: Moon Shot – Solution - 2 | | View Details | |
| | 2:30pm to 3:30 pm | Meeting: Project Status | | View Details | |
| | 4:00pm to 5:00 pm | Meeting: Spring Grooming | | View Details | |
| | 5:30pm to 6:30 pm | Meeting: Workshop | | View Details | |

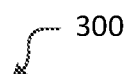
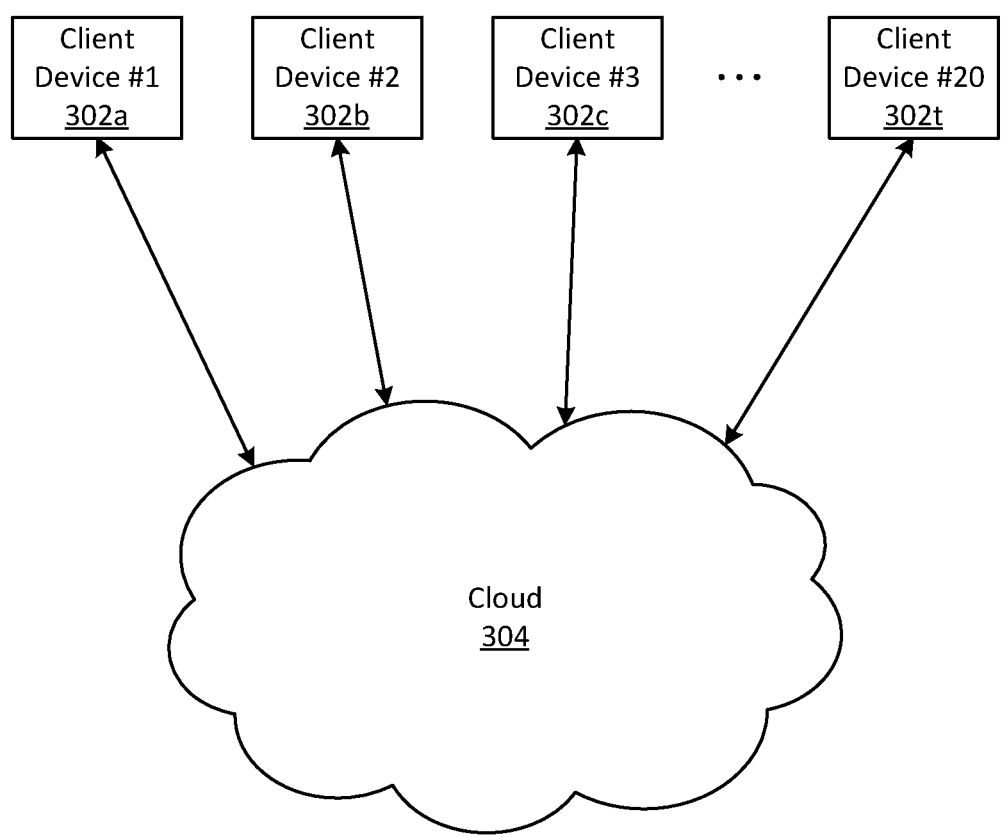
FIG. 3

500

Meeting Tracking

502 → Status    504 →

| Date | Time | Meeting | Status | | |
|---|---|---|---|---|---|
| 25 April 2022 | 2:00pm to 2:30 pm | Meeting: Project Priority | | | View Details |
| | 2:30pm to 3:30 pm | Meeting: Stack Holder Priority | | | View Details |
| | 4:00pm to 5:00 pm | Meeting: Status Meeting | | | View Details |
| | 5:30pm to 6:30 pm | Meeting: Tex - Schedule | | | View Details |
| 26 April 2022 | 2:00pm to 2:30 pm | Meeting: Moon Shot – Solution - 1 | | | View Details |
| | 2:30pm to 3:30 pm | Meeting: Staff Meeting | | | View Details |
| | 4:00pm to 5:00 pm | Meeting: Sprint Planning | | | View Details |
| | 5:30pm to 6:30 pm | Meeting: Environment Readiness | | | View Details |
| 27 April 2022 | 2:00pm to 2:30 pm | Meeting: Leadership Prep Session | | | View Details |
| | 2:30pm to 3:30 pm | Meeting: Hackathon Schedule | | | View Details |
| | 4:00pm to 5:00 pm | Meeting: Project Priority | | | View Details |
| | 5:30pm to 6:30 pm | Meeting: Status Meeting | | | View Details |
| 28 April 2022 | 2:00pm to 2:30 pm | Meeting: Moon Shot – Solution - 2 | | | View Details |
| | 2:30pm to 3:30 pm | Meeting: Project Status | | | View Details |
| | 4:00pm to 5:00 pm | Meeting: Spring Grooming | | | View Details |
| | 5:30pm to 6:30 pm | Meeting: Workshop | | | View Details |

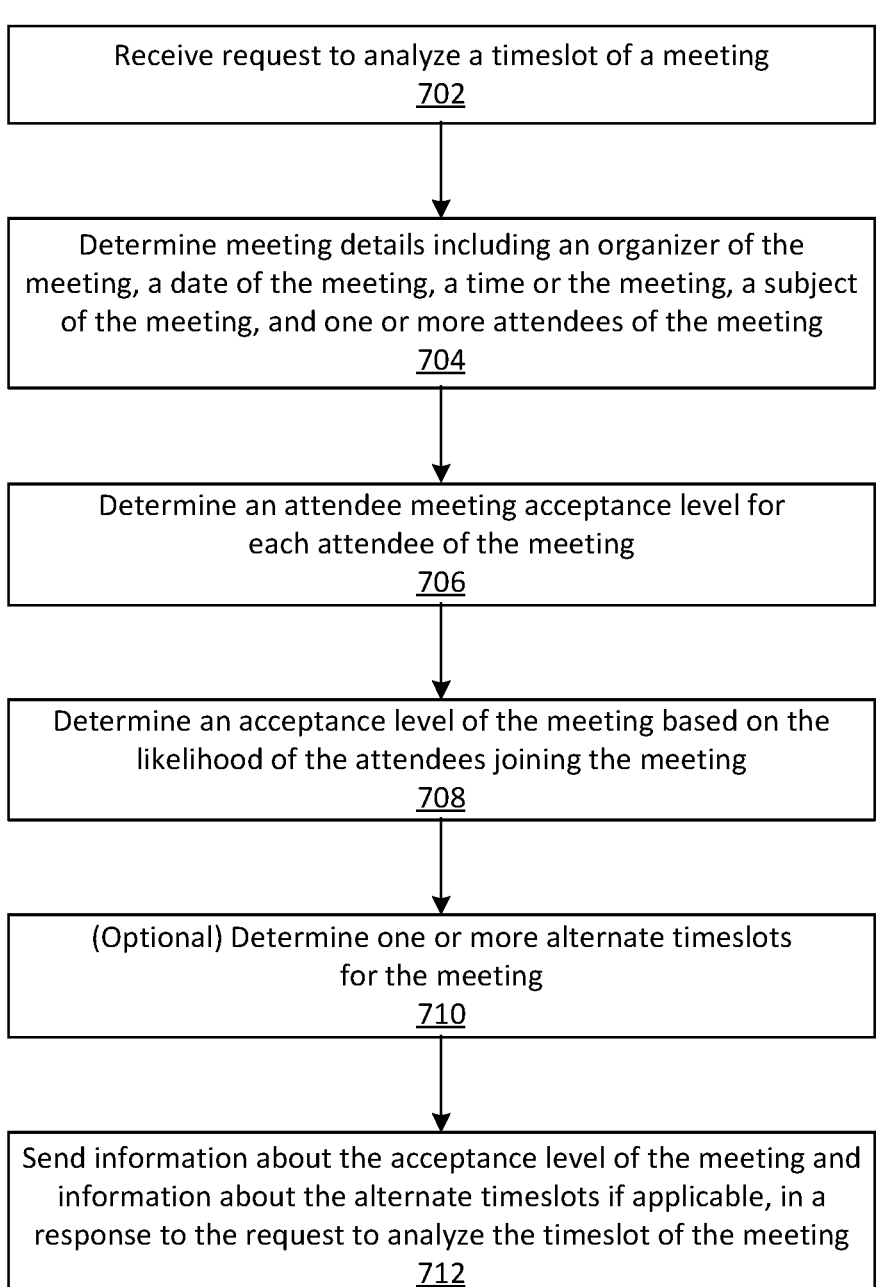

```
Receive request to analyze a timeslot of a meeting
                        702
```

```
Determine meeting details including an organizer of the
meeting, a date of the meeting, a time or the meeting, a subject
of the meeting, and one or more attendees of the meeting
                        704
```

```
Determine an attendee meeting acceptance level for
each attendee of the meeting
                        706
```

```
Determine an acceptance level of the meeting based on the
likelihood of the attendees joining the meeting
                        708
```

```
(Optional) Determine one or more alternate timeslots
for the meeting
                        710
```

```
Send information about the acceptance level of the meeting and
information about the alternate timeslots if applicable, in a
response to the request to analyze the timeslot of the meeting
                        712
```

INTELLIGENT MEETING TIMESLOT ANALYSIS AND RECOMMENDATION

BACKGROUND

Organizations schedule meetings for a variety of reasons. For example, within a company, employees may participate in (e.g., attend) monthly planning meetings, weekly status meetings, etc. In addition to regularly scheduled meetings, employees and other persons associated with an organization ("users") may be invited to meetings to connect, discuss, present, learn, build, network, and communicate. Online or "virtual" meetings are an increasingly popular way for people to collaborate, particularly when they are in different physical locations. Online meeting services, such as TEAMS, ZOOM, and GOTOMEETING, may provide audio and video conferencing among other features.

To schedule a meeting, a user ("organizer") may use a calendaring application, such as OUTLOOK, to send an invitation (i.e., a meeting invite) to one or more other users ("attendees"). The invitation to a meeting may include a description of the meeting, the date and time the meeting is scheduled for, and, in the case of an online meeting, a link to join the online meeting. The invitation may also include buttons which the user receiving the invitation can use to accept, tentatively accept, or decline the invitation.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes generating a training dataset comprising a plurality of training samples, each training sample of the plurality of training samples comprising a plurality of relevant features from historical meeting information, the plurality of relevant features indicating an attendee of a historical meeting, an organizer of the historical meeting, a date of the historical meeting, a time of the historical meeting, and a subject category of the historical meeting, wherein the plurality of relevant features influence a prediction of an attendee meeting acceptance level. The method also includes training a machine learning (ML) model to predict an attendee meeting acceptance level for an invitation to a meeting using the training dataset, wherein training the ML model includes inputting the plurality of training samples to the ML model. The method further includes, by a computing device, receiving a request to analyze a timeslot of a meeting and determining meeting details, wherein the meeting details include an organizer of the meeting, a date of the meeting, a time of the meeting, a subject of the meeting, and one or more attendees of the meeting. The method also includes, by the computing device, predicting, using the ML model, an attendee meeting acceptance level for each attendee of the one or more attendees and determining an acceptance level of the meeting based on likelihood of the one or more attendees joining the meeting, wherein the likelihood of the one or more attendees joining the meeting is based at least on the predicted attendee meeting acceptance levels for the one or more attendees. The method further includes, by the computing device, sending information about the acceptance level of the meeting in a response to the request to analyze the timeslot of the meeting.

In some embodiments, the likelihood of the one or more attendees joining the meeting is based at least on prior commitments of the one or more attendees for the timeslot.

In some embodiments, the subject category of the historical meeting is determined using a multinomial Naive Bayes classifier with Term Frequency-Inverse Document Frequency (TF-IDF) to classify text of a subject of the historical meeting.

In some embodiments, the ML model includes a random forest classifier.

In some embodiments, the method also includes determining one or more alternate timeslot for the meeting and including information about the one or more timeslots in the response to the request to analyze the timeslot of the meeting.

In one aspect, the information about the acceptance level of the meeting indicates the one or more attendees that are out of office.

In one aspect, the information about the acceptance level of the meeting indicates the one or more attendees that have a conflict.

In one aspect, the information about the acceptance level of the meeting indicates the one or more attendees that are likely to join the meeting.

In one aspect, the information about the acceptance level of the meeting indicates the one or more attendees that may or may not join the meeting.

In one aspect, the information about the acceptance level of the meeting indicates the one or more attendees that are not likely to join the meeting.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3 is a diagram of a cloud computing environment in which various aspects of the concepts described herein may be implemented.

FIG. 5 is a diagram showing an example of a user interface (UI) that may be used to present information about meetings scheduled by a meeting organizer, in accordance with an embodiment of the present disclosure.

FIG. 7 is a flow diagram of an example process for analyzing a timeslot of a meeting, in accordance with an embodiment of the present disclosure.

DETAILED DESCRIPTION

As virtual is becoming the new norm and employees are increasingly connecting through meetings, it is increasingly common for employees to be double or triple booked for meetings. This can result in a loss of employee productivity as well as increased use of computing resources. For example, it is becoming an increasingly difficult task for a meeting organizer to examine employee calendars and schedule a meeting for timeslots to ensure that required meeting participants are available to attend the meeting scheduled for those timeslots. A scheduled meeting often gets canceled due to a required meeting participant declining an invitation to the meeting. A meeting cancelation may be at the eleventh hour in cases where a required participant accepts the invitation but, for some reason, is unable to attend the meeting. In any case, the canceled meeting will need to be rescheduled for another timeslot. Such cancellations and reschedules of meetings are a productivity risk to both meeting organizers and meeting attendees.

Disclosed embodiments can provide meeting organizers improved user experience to decide the best timeslots for meetings without laborious efforts and increased usage of computing resources in scheduling meetings. Disclosed embodiments can analyze the calendars of attendees and predict attendee meeting acceptance levels for the attendees. The prediction can be achieved by categorizing the individual meetings, analyzing individual meeting acceptance behavior, and learning the preferences of the attendees. Disclosed embodiments can continually analyze the attendees' calendars and alert meeting organizers of changes to the attendees' preferences (e.g., changes to an attendee's attendee meeting acceptance level). Disclosed embodiments can provide up-to-date acceptance level information about scheduled meetings to enable meeting organizers to proactively reschedule meetings which need to be rescheduled.

Figure 1:
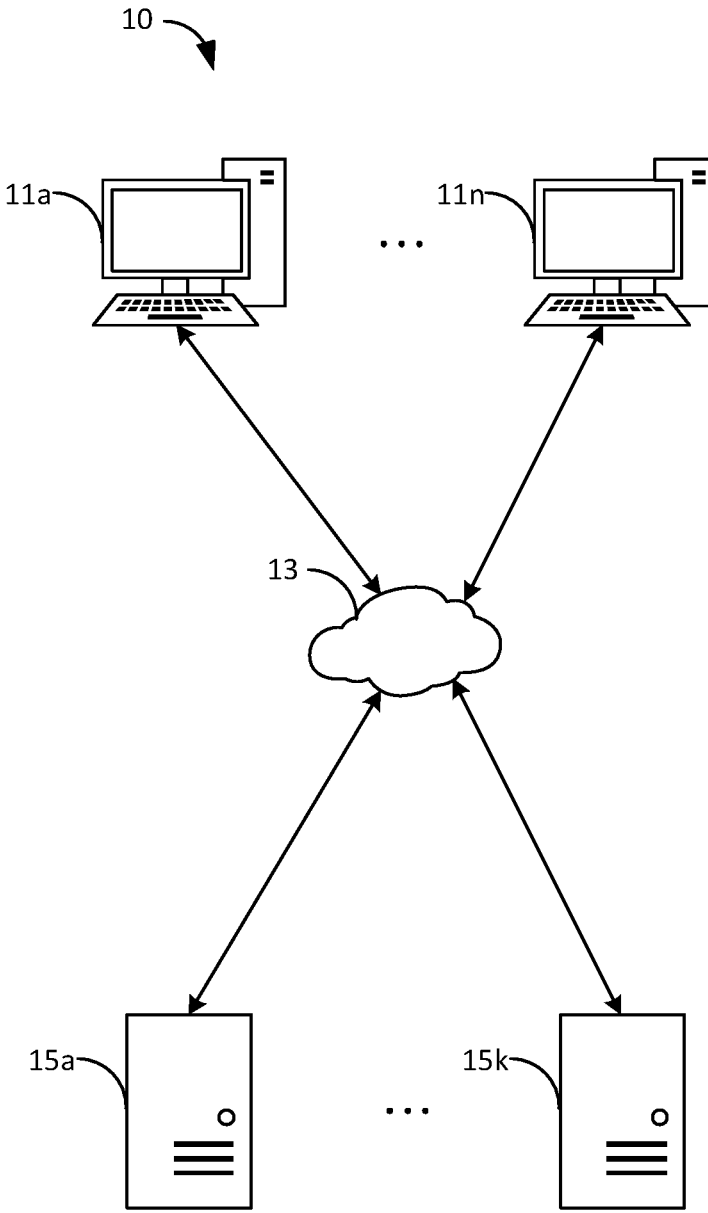
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
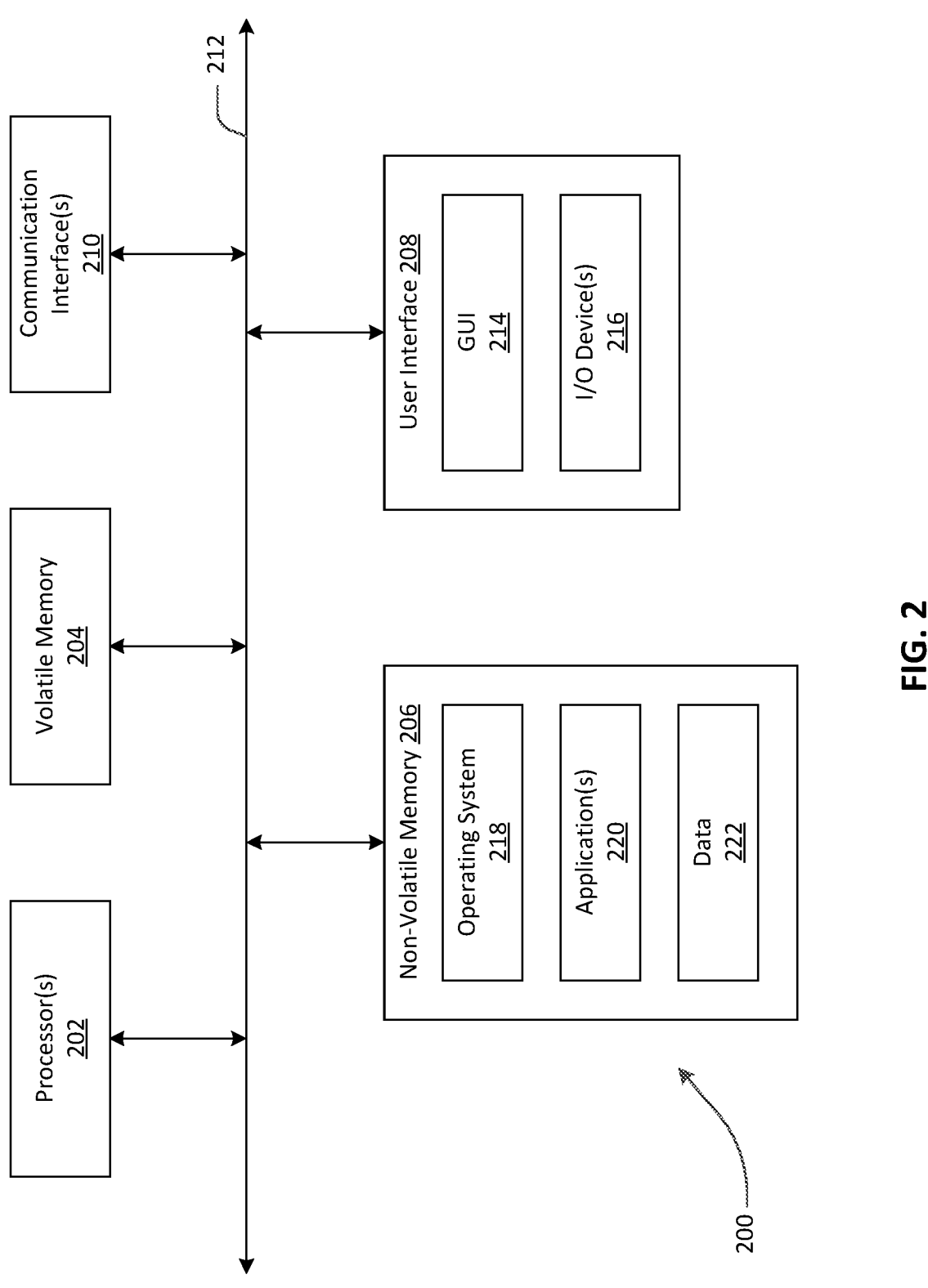
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 9). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (Saas), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
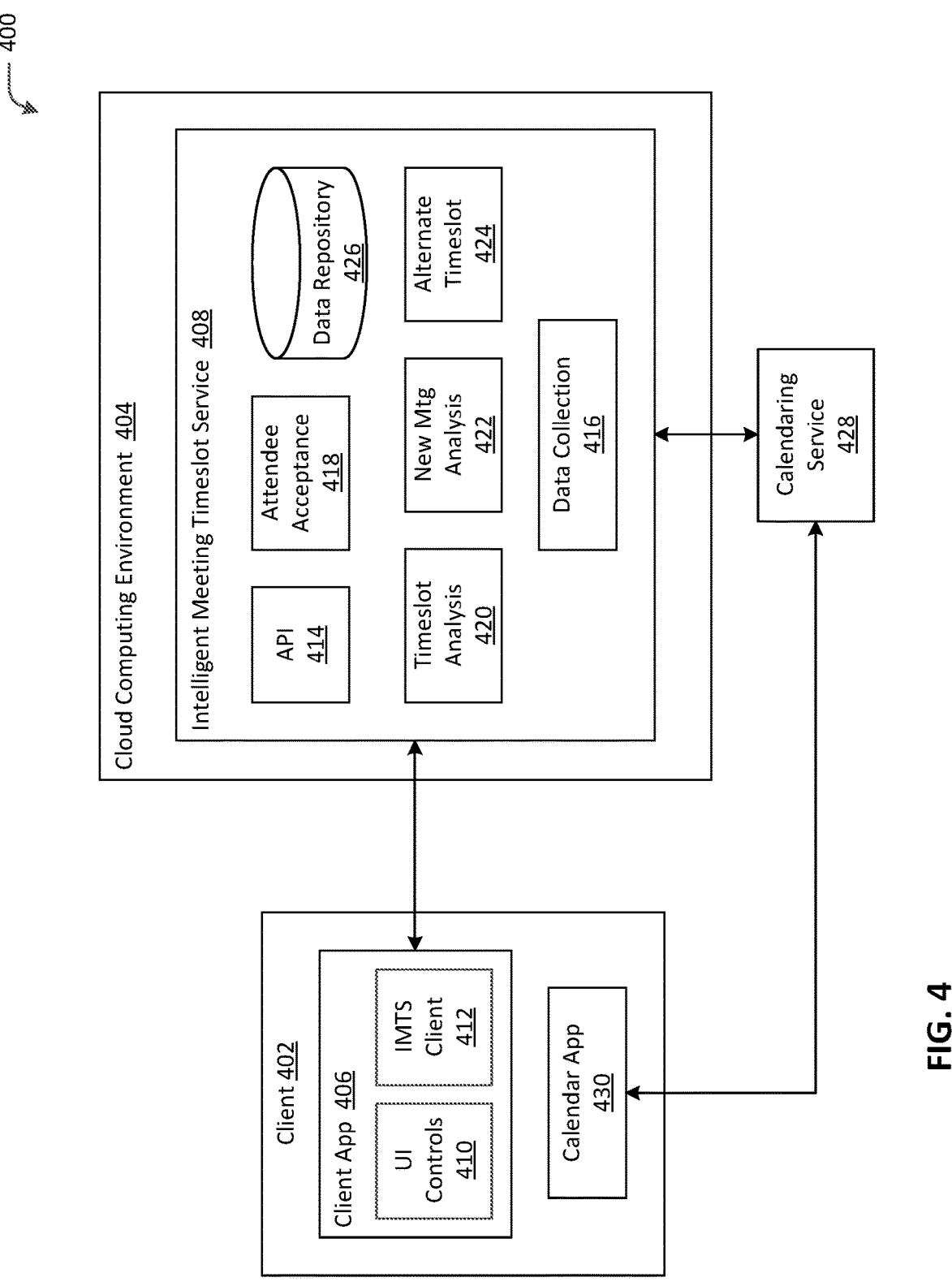
FIG. 4 is a block diagram of an illustrative system for intelligent meeting timeslot analysis and recommendation, in accordance with an embodiment of the present disclosure.

FIG. 4 is a block diagram of an illustrative system 400 for intelligent meeting timeslot analysis and recommendation, in accordance with an embodiment of the present disclosure. Illustrative system 400 includes a client application 406 configured to run on a client 402 and configured to communicate with a hosting environment, such as, for example, a cloud computing environment 404, via one or more computer networks. Client 402 and cloud computing environment 404 of FIG. 4 can be the same as or similar to client 11 of FIG. 1 and cloud computing environment 300 of FIG. 3, respectively.

As shown in FIG. 4, an intelligent meeting timeslot service 408 can be provided as a service (e.g., a microservice) within cloud computing environment 404. Client application 406 and intelligent meeting timeslot service 408 can interoperate to provide intelligent meeting timeslot analysis and recommendation, as variously disclosed herein. To promote clarity in the drawings, FIG. 4 shows a single client application 406 communicably coupled to intelligent meeting timeslot service 408. However, embodiments of intelligent meeting timeslot service 408 can be used to service many client applications (e.g., client applications 406) running on client devices (e.g., clients 402) associated with one or more organizations and/or users. Client application 406 and/or intelligent meeting timeslot service 408 may be implemented as computer instructions executable to perform the corresponding functions disclosed herein. Client application 406 and intelligent meeting timeslot service 408 can be logically and/or physically organized into one or more components. In the example of FIG. 4, client application 406 includes UI controls 410 and an intelligent meeting timeslot service (IMTS) client 412. Also, in this example, intelligent meeting timeslot service 408 includes an application programming interface (API) module 414, a data collection module 416, an attendee acceptance module 418, a timeslot analysis module 420, a new meeting analysis module 422, an alternate timeslot module 424, and a data repository 426.

The client-side client application 406 can communicate with the cloud-side intelligent meeting timeslot service 408 using an API. For example, client application 406 can utilize IMTS client 412 to send requests (or "messages") to intelligent meeting timeslot service 408 wherein the requests are received and processed by API module 414 or one or more other components of intelligent meeting timeslot service 408. Likewise, intelligent meeting timeslot service 408 can utilize API module 414 to send responses/messages to client application 406 wherein the responses/messages are received and processed by IMTS client 412 or one or more other components of client application 406 and/or client 402. In some embodiments, intelligent meeting timeslot service 408 can push data to one or more clients 402. For example, intelligent meeting timeslot service 408 may automatically determine attendee meeting acceptance levels for a particular meeting organizer and push information about the attendee meeting acceptance levels to a corresponding client 402 where it can be displayed for viewing by the meeting organizer (e.g., meeting tracking information can be displayed on a display connected to or otherwise associated with client 402). In some such embodiments, the attendee meeting acceptance level information and other information about the organizer's scheduled meetings can be stored for later use.

In addition to client application 406, various other applications can be installed on client 402, such as a calendar application 430. As shown in FIG. 4, calendar application 430 can communicate with a calendaring service 428. For example, a user can use calendar application 430 to access various functionality provided by calendaring service 428, such as scheduling meetings with one or more other users, checking calendars of other users, and receiving and replying to invitations to meetings, to provide a few examples. In some embodiments, calendar application 430 can correspond to an application (e.g., OUTLOOK) that provides event, task, and meeting scheduling and management functionality to a user of client 402.

Client application 406 can include various UI controls 410 that enable a user (e.g., a user of client 402), such as an employee or other associate within or associated with an organization, to access and interact with intelligent meeting timeslot service 408. In some embodiments, UI controls 410 can include UI elements/controls that a user can click/tap to request analysis of a timeslot of a meeting. For example, prior to or at the time of scheduling a meeting for a timeslot, a user (e.g., a meeting organizer) can click/tap the UI element/control to request intelligent meeting timeslot service 408 to analyze the timeslot of the meeting. UI controls 410, according to one embodiment, may also include additional UI elements/controls, such as input fields and date and time pickers, that the user can use to enter (e.g., specify) information about the meeting, such as a subject of the meeting, a start date and time and an end date and time (a timeslot) for the meeting, one or more required attendees, and optionally one or more optional attendees. In response to the user's input, client application 406 can send a message to intelligent meeting timeslot service 408 requesting analysis of a timeslot of a meeting, including the specified details of the meeting.

Client application 406 can also include UI controls 410 (e.g., a button or other type of control/element) for displaying information about an acceptance level of a meeting, for example, on a display connected to or otherwise associated with client 402. According to one embodiment, information about an acceptance level of a meeting may be provided by intelligent meeting timeslot service 408 in response to a request to analyze a timeslot of the meeting. Such information may include a summary of attendee meeting acceptance levels for the specified meeting (e.g., include an indication of the attendees accepting, tentatively accepting, or declining an invitation to the meeting scheduled for the specified timeslot). UI controls 410 can also include UI elements/controls for displaying recommended timeslots for a meeting. For example, based on the results of the analysis of a timeslot of a meeting, intelligent meeting timeslot service 408 may include with the information about an acceptance level of the meeting one or more alternate timeslots for the meeting (e.g., suggest one or more alternate timeslots for scheduling the meeting).

In some embodiments, client application 406 can include UI controls 410, such as, for example, a toggle switch, a button, a checkbox, or other type of control, for enabling a selectable track my meetings feature. For example, a user (e.g., a meeting organizer) can click/tap UI element/control to selectively enable the track my meetings feature. In response to a user input to enable or disable the track my meetings feature, client application 406 can send an indication to intelligent meeting timeslot service 408 notifying of the enabling or disabling of the track my meetings feature by the user. In response to such indication, intelligent meeting timeslot service 408 can maintain a record of the enabling or disabling of the track my meetings feature for the user. For example, if the track my meetings feature is enabled for a user, intelligent meeting timeslot service 408 can continually track the meetings which are organized (scheduled) by the user and provide a meeting tracking summary. That is, if this feature is enabled for a user, intelligent meeting timeslot service 408 can continually track the meetings scheduled by the user and provide a meeting tracking summary. In some embodiments, for a particular meeting scheduled by a user, the meeting tracking summary can include acceptance level information for the meetings organized by the user. In some embodiments, for a particular meeting organized by the user, the acceptance level information can include an indication of attendees that accepted, tentatively accepted, and declined the invitation to the meeting. In some embodiments, intelligent meeting timeslot service 408 can continually track a scheduled meeting from the date an invitation to the meeting (i.e., a meeting invite) is created to the scheduled date of the meeting. Additionally or alternatively, intelligent meeting timeslot service 408 can track a scheduled meeting when a new meeting is scheduled and/or when there is a change to a scheduled meeting (e.g., a change to a meeting invite). For example, in one implementation, intelligent meeting timeslot service 408 can monitor a calendaring service being utilized by the organization to detect scheduling of a meeting and/or change to a scheduled meeting. Additionally or alternatively, client application 406 can notify intelligent meeting timeslot service 408 of a scheduling of a meeting and/or a change to a scheduled meeting. For example, when a meeting organizer uses client application 406 on their client device to schedule a meeting, client application 406 can send a message to intelligent meeting timeslot service 408 notifying of the scheduling of the meeting.

Client application 406 can also include UI controls 410 (e.g., a button or other type of control/element) for displaying a meeting tracking summary, for example, on a display connected to or otherwise associated with client 402. According to one embodiment, the meeting tracking summary for a user may be provided by intelligent meeting timeslot service 408 when the track my meetings feature is enabled for the user. The meeting tracking summary can include up-to-date acceptance level information about the meetings scheduled by the user. Further description of the meeting tracking summary is provided below at least with respect to FIG. 5.

In the embodiment of FIG. 4, client application 406 is shown as a stand-alone client application. In other embodiments, client application 406 may be implemented as a plug-in or extension to another application (e.g., a web browser) on client 402, such as, for example, calendar application 430. In such embodiments, UI controls 410 may be accessed within the other application in which client application 406 is implemented (e.g., accessed within calendar application 430).

Referring to the cloud-side intelligent meeting timeslot service 408, data collection module 416 is operable to collect or retrieve individual user's calendar details from one or more calendaring services (e.g., calendaring service 428). In some embodiments, calendaring service 428 may correspond to a collaboration service, including a meeting scheduling service, provided by the organization for use by users associated with the organization to schedule meetings. Data collection module 416 can utilize application programming interfaces (APIs) provided by calendaring service 428 to query and/or retrieve information and materials therefrom. For example, data collection module 416 can use a Representational State Transfer (REST)-based API or other suitable API provided by calendaring service 428 to collect information therefrom (e.g., to collect the calendar details). In the case where calendaring service 428 is web-based, data collection module 416 can use a Web API provided by calendaring service 428 to query and/or retrieve information and materials therefrom.

A particular calendaring service (e.g., calendaring service 428) from which data collection module 416 can retrieve the user calendar details can vary between different organizations. The particular calendaring service (e.g., calendaring service 428) can be hosted within a cloud computing environment (e.g., cloud computing environment 404 or a different cloud computing environment) or within an on-premise data center (e.g., an on-premise data center of the organization that is utilizing calendaring service 428).

As mentioned previously, data collection module 416 can retrieve calendar details of the individual users associated with the organization from calendaring service 428. Such calendar details can include, for a particular user, information about the user's historical meetings and other data and materials about the historical meetings. For example, the meeting-related information can include, for a particular historical meeting of a user, an organizer of the meeting (e.g., a user who scheduled the meeting), meeting subject (e.g., a title of the meeting), meeting date and time (e.g., a start date and time and an end date and time of the meeting), the user's attendee meeting acceptance level (e.g., whether the user accepted, tentatively accepted, or declined the meeting), meeting duration, attendees of the meeting, optional attendees of the meeting, and attendees invited to the meeting (e.g., users to whom an invitation to the meeting was sent). These examples of meeting-related information are merely illustrative and may vary depending on the capabilities of the calendaring service utilized by the organization.

In some embodiments, data collection module 416 can retrieve the calendar details of the individual users from calendaring service 428 on a continuous or periodic basis (e.g., according to a predetermined schedule specified by the organization). Additionally or alternatively, data collection module 416 can retrieve the calendar details of the individual users from calendaring service 428 in response to an input. For example, a user, such as a member of the organization's information technology (IT) team, can use their client 402 to access intelligent meeting timeslot service 408 and issue a request to intelligent meeting timeslot service 408 that causes data collection module 416 to retrieve the calendar details of the individual users from calendaring service 428. In some embodiments, data collection module 416 can store (e.g., record) the calendar details including the meeting information retrieved from calendaring service 428 within data repository 426, where it can subsequently be retrieved and used. For example, the recorded meeting information from calendaring service 428 can be retrieved from data repository 426 and used to build (e.g., train) a machine learning (ML) model to predict an attendee meeting acceptance level for an invitation to a meeting. In some embodiments, data repository 426 may correspond to a storage service within the computing environment of intelligent meeting timeslot service 408.

Attendee acceptance module 418 is operable to utilize the calendar details of the individual users retrieved by data collection module 416 to determine attendee meeting acceptance levels for invitations to meetings. That is, for a given invitation to a meeting for an attendee, attendee acceptance module 418 can determine an attendee meeting acceptance level for the invitation, wherein the attendee meeting acceptance level indicates whether the attendee is likely to accept, tentatively accept, or decline the invitation. Attendee acceptance module 418 can store (e.g., record) the attendee meeting acceptance level information within data repository 426, where it can subsequently be retrieved and used. In some embodiments, attendee acceptance module 418 can implement or include a decision tree-based algorithm, such as a random forest algorithm, trained for classification using a training dataset generated from information about a corpus of the organization's historical meetings. Such information is sometimes referred to herein as "historical meeting information." For example, the historical meeting information may be determined from the calendar details of the individual users associated with the organization retrieved by data collection module 416 from calendaring service 428. Once the decision tree-based algorithm is trained, the trained ML model can, in response to input of information about an invitation to a meeting for an attendee (e.g., input of a feature vector that represents relevant features from the meeting invite), predict an attendee meeting acceptance level for the invitation based on the learned behaviors (or "trends") in the training dataset. In some embodiments, the predicted attendee meeting acceptance level is an indication as to whether the attendee is likely to accept, tentatively accept, or decline the invitation.

In some embodiments, the training dataset can include data (e.g., a feature) about a category of the individual historical meetings. For example, a category (e.g., a meeting category) may be a class or division of the subjects of the historical meetings regarded as having a particular shared characteristic (e.g., a shared topic). The category of a historical meeting may be determined from classifying the subject of the historical meeting (e.g., classifying a title of the historical meeting). To determine a category of the individual historical meetings, according to one embodiment, attendee acceptance module 418 may leverage an ML model, such as a multinomial Naive Bayes classifier with Term Frequency-Inverse Document Frequency (TF-IDF), to classify the text of the subject of the individual historical meetings. In brief, the multinomial Naive Bayes classifier is a probabilistic learning method that can be used in Natural Language Processing (NLP). The multinomial Naive Bayes classifier can assign the text of the subjects of the historical meetings (i.e., documents) to classes by determining that a document belongs to the class of other documents. Each document (i.e., each historical meeting subject) is comprised of multiple words (i.e., text) that contribute to an understanding of the document's contents (e.g., contributes to an understanding of the contents of a subject of a historical meeting). A class can be understood to be a tag (classification) of one or more documents, referring to a shared topic. The multinomial Naive Bayes classifier classifies the words in the subjects of the historical meetings as either falling under or not falling under a predetermined tag.

A simplified example of a portion of a training dataset for the ML model (e.g., multinomial Naive Bayes classifier) is shown in Table 1.

TABLE 1

| Meeting Subject | Category |
| --- | --- |
| Technology Incubation: Weekly Sync Up | Initiatives |
| Innovation - Evaluation Panel | Initiatives |
| NorthStar Assessment | Project |
| Staff Meeting | Staff |
| All Hands | Organization |
| Workshop | Project |
| Weekly Mgmt and Architects Syncup | Syncup |
| Project Meeting | Project |
| MemSQL Infra | Other |
| Project Mtg | Project |

In the example of Table 1, each row represents a subject of a historical meeting ("Meeting Subject") and a corresponding class ("Category") such as initiatives, project, staff, organization, syncup, and other, to provide a few examples. For example, as shown, the meeting subject "Staff Meeting" can correspond to the class "Staff." Also, as shown, the meeting subject "Workshop" can correspond to the class "Project" and the meeting subject "Weekly Mgmt and Architects Syncup" can correspond to the class "Syncup." The text in the meeting subjects and corresponding classes illustrated in Table 1 are merely examples of such and should not be construed to limit the embodiments described herein.

Each document in the dataset can be represented as a set of words and a count of the number of times each word occurs in the document. In other words, the words in each historical meeting subject can be the attributes or features and each feature can have a corresponding value (e.g., an integer value) that represents a count of the number of times the particular word (i.e., the particular feature) occurs in the historical meeting subject. The set of features (also known as a "dictionary of features" or more simply as a "dictionary") can be generated from all the documents in the dataset (e.g., generated from contests of the subjects of all the historical meetings in the dataset). Each document in the dataset can then be transformed to a feature vector that represents the number of times each of the features in the dictionary occurs or did not occur in the document. The feature vectors representing the documents can then be converted to a matrix of token (feature) counts. A TF-IDF transformation can then be applied to transform the matrix of token counts into a normalized TF-IDF representation. TF-IDF is a statistical algorithm that evaluates how important a token (feature) is to a document (e.g., a historical meeting subject). The importance of a token increases proportionally to the number of times the token appears in a historical meeting subject but is offset by the frequency of the token in the corpus of historical meeting subjects (e.g., the dataset). The feature vectors can then be used to train the ML model (e.g., the multinomial Naive Bayes classifier). Once trained, the trained ML model can, in response to input of a subject of a meeting (e.g., a historical meeting or a new meeting), categorize the subject of the meeting into a class based on the learned behaviors (or "trends") in the training dataset.

As mentioned previously, in some embodiments, attendee acceptance module 418 can implement or include a random forest algorithm trained for classification using a training dataset generated from a corpus of the organization's historical meeting information. In some embodiments, the corpus of the organization's historical meeting information may be retrieved from data repository 426 and feature engineering can be used to generate a training dataset (e.g., a set of relevant features with corresponding labels, such as labeled data for supervised machine learning). In some embodiments, feature extraction may be performed to extract or construct new features (e.g., meeting category, week of the meeting, etc.) from the historical meeting information. In any case, the relevant features used for training the random forest algorithm are highly correlated with the thing being predicted by the generated ML model (e.g., the generated random forest classifier). A simplified example of the relevant features of several training samples of the training dataset is shown in Table 2.

TABLE 2

| At-tendee | Meeting Subject Category | Orga-nizer | Date | Time | Acceptance Level |
|---|---|---|---|---|---|
| Kuma | Project | Murthy | Jun. 16, 2022 | 6:30PM | Declined |
| Kuma | Initiative | Divya | Jun. 16, 2022 | 5:30PM | Accepted |
| Kuma | Workshop | Ajay | Jun. 16, 2022 | 6:00PM | Accepted |
| Kuma | Project | Praveen | Jun. 16, 2022 | 7:00PM | Accepted |
| Kuma | Organization | Ram | Jun. 16, 2022 | 8:30PM | Accepted |
| Kuma | Staff | Kran | Jun. 16, 2022 | 9:00PM | Accepted |
| Melpo | Syncup | Mube | Jun. 16, 2022 | 7:30PM | Declined |
| Melpo | Initiative | Laxmi | Jun. 16, 2022 | 5:30PM | Accepted |
| Melpo | Project | Karthik | Jun. 16, 2022 | 5:30PM | Tentative |
| Melpo | Staff | Murthy | Jun. 16, 2022 | 6:30PM | Accepted |
| Melpo | Organization | Rob | Jun. 16, 2022 | 7:30PM | Accepted |
| Melpo | Workshop | Ajay | Jun. 16, 2022 | 8:30PM | Accepted |
| Melpo | Syncup | Gopi | Jun. 16, 2022 | 6:30PM | Declined |

In the example of Table 2, the structured columns represent the different relevant features (variables) of the historical meeting information and a row represents individual historical meetings. The relevant features illustrated in Table 2 are merely examples of features that may be extracted from the historical meeting information and used to generate the training dataset and should not be construed to limit the embodiments described herein. Also, the number of training samples shown in Table 2 is merely illustrative and it should be appreciated that the training dataset generally contains a much larger number of training samples.

As shown in Table 2, the relevant features may include Attendee, Meeting Subject Category, Organizer, Date, Time, and Acceptance Level. The feature Attendee indicates an attendee associated with the historical meeting (e.g., an attendee who received a meeting invitation for the historical meeting). The feature Meeting Subject Category indicates a category of the historical meeting (e.g., historical meeting category). The feature Organizer indicates a user who organized (scheduled) the historical meeting. The feature Date indicates a date of the historical meeting (e.g., historical meeting scheduled date). The feature Time indicates a time of the historical meeting (e.g., historical meeting scheduled start time). The feature Acceptance Level is the label corresponding to the historical meeting and indicates an attendee meeting acceptance level of the historical meeting (e.g., an acceptance level that indicates whether an attendee accepted, tentatively accepted, or declined an invitation to the historical meeting). For example, the first training sample in Table 2 shows that an attendee, Kuma, declined a meeting scheduled by an organizer, Murthy, having the category, Project, scheduled for date, Jun. 16, 2022, and time, 6:30 PM. That is to say, for a meeting scheduled by an organizer, Murthy, having the category, Project, scheduled for date, Jun. 16, 2022, and time, 6:30 PM, the attendee meeting acceptance level for attendee, Kuma, is declined. The second training sample in Table 2 shows that attendee, Kuma, accepted a meeting scheduled by an organizer, Divya, having the category, Initiative, scheduled for date, Jun. 16, 2022, and time, 5:30 PM. That is to say, for a meeting scheduled by an organizer, Divya, having the category, Initiative, scheduled for date, Jun. 16, 2022, and time, 5:30 PM, the attendee meeting acceptance level for attendee, Kuma, is accepted.

The random forest is a supervised learning algorithm that builds (e.g., constructs) an ensemble of complex decision trees (e.g., classification decision trees). The decision trees may be trained using bagging (also known as bootstrap aggregation). Bagging is a parallel ensemble method where the individual decision trees are trained on a subset of the training dataset (e.g., the individual decision trees are trained on different data samples and different features). Each decision tree is trained independently and generates a prediction. The final prediction (e.g., output) of the random forest classifier is based on aggregating the predictions of the individual decision trees. For example, the final prediction from the random forest classifier may be an average of the values (i.e., predictions) of all decision trees in the ensemble. Hyperparameter tuning, such as, for example, adjusting the number of classifiers (e.g., the classification decision trees) constructed in the random forest classifier, may be performed to improve the accuracy of the ML model. To make a prediction for a new meeting (e.g., a prediction of an attendee meeting acceptance level for an invitation to the new meeting), relevant features of the new meeting run through the different classifiers of the random forest classifier, and each classifier generates a prediction, and the predictions from the different classifiers can be aggregated (e.g., averaged) to generate the prediction of the random forest classifier.

Still referring to intelligent meeting timeslot service 408, timeslot analysis module 420 is operable to analyze timeslots for meetings and provide information about the attendees likely joining (e.g., likely attending) the meetings scheduled for the timeslots. In some embodiments, timeslot analysis module 420 may analyze a timeslot in response to a request to analyze a timeslot of a meeting. For example, a user of client application 406 may click/tap a UI control/element displayed within a UI of client application 406 to request analysis of a timeslot of a meeting. In response to such input, client application 406 may send a request to analyze a timeslot of a meeting to intelligent meeting timeslot service 408.

In some embodiments, a request to analyze a timeslot of a meeting may be from another component of intelligent meeting timeslot service 408. For example, new meeting analysis module 422 may request analysis of a timeslot of a meeting if an acceptance level of a new meeting that is being scheduled is determined to be higher than an acceptance of an existing meeting (e.g., a new meeting that is being scheduled has a higher acceptance level than a meeting that is already scheduled). In such cases, the request will be to analyze a timeslot of the existing meeting (the meeting that is already scheduled).

To analyze a timeslot of a meeting, timeslot analysis module 420 can retrieve information about the meeting, such as an organizer of the meeting, a subject of the meeting, a start date and time and an end date and time (a timeslot) of the meeting, and one or more attendees (e.g., required attendees). In some embodiments, the meeting details may be included with the request to analyze a timeslot of a meeting. For example, client application 406 may provide the meeting details with a request to analyze a timeslot of a meeting. In some embodiments, the meeting details may be retrieved from data repository 426. For example, timeslot analysis module 420 may retrieve the meeting details from data repository 426 in cases where new meeting analysis module 422 requests analysis of a timeslot for an existing meeting. In any case, once the attendees of the meeting are determined, for each attendee of the meeting, timeslot analysis module 420 can determine an attendee meeting acceptance level for the attendee. For a meeting that is yet to be scheduled (e.g., a new meeting), timeslot analysis module 420 can utilize attendee acceptance module 418 to predict or otherwise determine attendee meeting acceptance levels for the attendees. For an existing meeting, timeslot analysis module 420 can retrieve the attendee meeting acceptance levels for the attendees from data repository 426. For example, for existing meetings, attendee acceptance module 418 may have previously determined the attendee meeting acceptance levels for the attendees of the existing meetings and stored the attendee meeting acceptance level information within data repository 426.

In some embodiments, timeslot analysis module 420 can determine an acceptance level of a meeting (e.g., a meeting scheduled for a timeslot) based on a likelihood of the attendees joining the meeting (e.g., likelihood of the attendees invited to the meeting attending the meeting). In some embodiments, the likelihood of the attendees joining the meeting may be determined from the attendee meeting acceptance levels predicted for the attendees. In some embodiments, the determination of the likelihood of the attendees joining the meeting may also consider the attendees' prior commitments for the timeslot, for example, as determined from the calendar details of the attendees. That is, the likelihood of the attendees joining the meeting may be determined from the attendee meeting acceptance levels predicted for the attendees and the attendees' prior commitments for the timeslot. For example, if the calendar details of an attendee indicate that the attendee is out of office (e.g., not available for meetings) during a timeslot for which a meeting is scheduled, it can be determined that the attendee is not likely to join the meeting scheduled for that timeslot. If the calendar details of the attendee indicate that the attendee does not have any conflicts (e.g., is available) for the timeslot for which the meeting is scheduled, the determination of whether the attendee is likely to join the meeting can be based on the attendee meeting acceptance level predicted for the attendee. For example, if the predicted attendee meeting acceptance level is that the attendee is likely to decline an initiation to the meeting, it can be determined that the attendee is not likely to join the meeting scheduled for that timeslot. If the predicted attendee meeting acceptance level is that the attendee is likely to tentatively accept the initiation to the meeting, it can be determined that the attendee may or may not join the meeting scheduled for that timeslot. In this case, it cannot conclusively be determined that the attendee is likely to join the meeting scheduled for that timeslot. If the predicted attendee meeting acceptance level is that the attendee is likely to accept the initiation to the meeting, it can be determined that the attendee is likely to join the meeting scheduled for that timeslot.

Continuing the above example, if the calendar details of the attendee indicate that the attendee is tentatively scheduled for another meeting during the timeslot for which the meeting is scheduled (e.g., attendee has a tentative conflict for the timeslot for which a current meeting is scheduled), the determination of whether the attendee is likely to join the meeting (i.e., likely to join the current meeting) can be based on the attendee meeting acceptance levels for the current meeting and the other meeting (i.e., the conflicting meeting). Similarly, if the calendar details of the attendee indicate that the attendee is scheduled for another meeting during the timeslot for which the current meeting is scheduled (e.g., attendee has a hard conflict for that timeslot for which the current meeting is scheduled), the determination of whether the attendee is likely to join the current meeting can be based on the attendee's attendee meeting acceptance levels for the current meeting and the other meeting (i.e., the conflicting meeting). For example, if the attendee's attendee meeting acceptance level for the conflicting meeting is higher than the attendee's predicted attendee meeting acceptance level for the current meeting, it can be determined that the attendee is not likely to join the current meeting scheduled for that timeslot. If the attendee's attendee meeting acceptance level for the conflicting meeting is the same as the attendee's predicted attendee meeting acceptance level for the current meeting, it can be determined that the attendee may or may not join the current meeting scheduled for that timeslot. In this case, it cannot conclusively be determined that the attendee is likely to join the current meeting scheduled for that timeslot. If the attendee's predicted attendee meeting acceptance level for the current meeting is higher than the attendee's attendee meeting acceptance level for the other meeting, it can be determined that the attendee is likely to join the current meeting scheduled for that timeslot.

In some embodiments, timeslot analysis module 420 can assign to each attendee of a meeting a meeting acceptance score that represents a likelihood of the attendee joining the meeting. In one illustrative implementation, for a particular attendee of a meeting, timeslot analysis module 420 can assign to the attendee a first meeting acceptance score (e.g., meeting acceptance score=0) if the attendee likely to decline an invitation to the meeting, a second meeting acceptance score (e.g., meeting acceptance score=1) if the attendee is likely to tentatively accept the invitation to the meeting, and a third meeting acceptance score (e.g., meeting acceptance score=2) if the attendee is likely to accept the invitation to the meeting. In some such embodiments, the meeting acceptance scores of the attendees of a meeting can be used to represent an acceptance level of the meeting. For example, the acceptance level of the meeting can be an average, a sum, or other accumulation of the meeting acceptance scores of the attendees of the meeting.

Timeslot analysis module 420 may send or otherwise provide the results of the analysis of a timeslot of a meeting in a response to the request to analyze the timeslot of the meeting. For example, according to one embodiment, timeslot analysis module 420 can send information about an acceptance level of a meeting in a response to the request to analyze the timeslot of the meeting. In some embodiments, timeslot analysis module 420 can store (e.g., record) information about acceptance levels of meetings within data repository 426, where it can subsequently be retrieved and used.

In some embodiments, timeslot analysis module 420 may include one or more alternate timeslot suggestions in a response to a request to analyze a timeslot of a meeting. For example, if the results of the analysis indicate that not all attendees are likely to join the meeting, timeslot analysis module 420 can determine one or more alternate timeslots for the meeting and send or otherwise include information about the alternate timeslots in the response to the request to analyze the timeslot of the meeting. For example, in one implementation, attendee meeting acceptance scores can be used to determine whether all the attendees are likely to join the meeting. In some embodiments, timeslot analysis module 420 can utilize alternate timeslot module 424 to determine alternate timeslots for a meeting.

New meeting analysis module 422 is operable to analyze calendars of users associated with the organization and inform meeting organizers of changes to their meetings. In some embodiments, new meeting analysis module 422 may analyze the calendars of users upon determining a scheduling of a new meeting and/or a change to a scheduled meeting. For purposes of this discussion, a change to a scheduled meeting can be understood to be the same as a scheduling of a new meeting. For example, as mentioned previously, a user may enable a track my meetings feature requesting continual tracking of meetings organized (scheduled) by the user. To provide tracking of such meetings, in one implementation, new meeting analysis module 422 may monitor for scheduling of new meetings and determine whether the new meetings impact the meetings organized by the user. New meeting analysis module 422 can monitor a calendaring service being utilized by the organization (e.g., calendaring service 428) to detect scheduling of a meeting and/or a change to a scheduled meeting. New meeting analysis module 422 can monitor calendaring service 428 for scheduling of new meetings on a continuous or periodic basis (e.g., according to a predetermined schedule specified by the organization). New meeting analysis module 422 can also be notified of a scheduling of a new meeting and/or a change to a scheduled meeting, for example, from client application 406.

In more detail, in response to determining a scheduling of a new meeting, new meeting analysis module 422 can check to determine whether the timeslot of the new meeting conflicts with a timeslot of an existing meeting. New meeting analysis module 422 can retrieve or otherwise obtain details of existing meetings from calendaring service 428. If there is no timeslot conflict, new meeting analysis module 422 can determine that the scheduling of the new meeting does not impact any existing meeting. In this case, a notification is not generated since there is no impact to an existing meeting.

If there is a timeslot conflict between the new meeting and an existing meeting, new meeting analysis module 422 can determine an attendee meeting acceptance level for each attendee of the new meeting. In one implementation, new meeting analysis module 422 can utilize attendee acceptance module 418 to predict or otherwise determine attendee meeting acceptance levels for the attendees. New meeting analysis module 422 can then determine an acceptance level of the new meeting based on the attendee meeting acceptance levels of the attendees and prior commitments of the attendees. In one implementation, new meeting analysis module 422 can utilize timeslot analysis module 420 to determine the acceptance level of the new meeting. New meeting analysis module 422 can then check to determine whether the acceptance level of the new meeting is higher than the acceptance level of the conflicting meeting. Note that the conflicting meeting is the existing meeting that conflicts with the new meeting. Information about the acceptance level of the conflicting meeting may be retrieved from data repository 426. If the acceptance level of the new meeting is not higher than the acceptance level of the conflicting meeting, new meeting analysis module 422 can determine that the scheduling of the new meeting has no impact on the conflicting meeting (e.g., there is no impact to the existing meeting). New meeting analysis module 422 can then check for timeslot conflicts with other existing meetings.

If the acceptance level of the new meeting is higher than the acceptance level of the conflicting meeting, it can be determined that the timeslot of the conflicting meeting needs analysis. In this case, the timeslot of the conflicting meeting is analyzed since the scheduling of the new meeting may impact the meeting preferences of the attendees of the conflicting meeting which, in turn, may impact the acceptance level of the conflicting meeting. In one implementation, new meeting analysis module 422 can utilize timeslot analysis module 420 to analyze the timeslot of the conflicting meeting. For example, new meeting analysis module 422 can retrieve the details of the conflicting meeting from data repository 426 and send a request to timeslot analysis module 420 for analysis of the timeslot of the conflicting meeting. New meeting analysis module 422 can then send or otherwise provide the results of the analysis to an organizer of the conflicting meeting (e.g., send information about the conflicting meeting to the organizer of the conflicting meeting).

Alternate timeslot module 424 is operable to identify alternate timeslots for meeting. In some embodiments, alternate timeslot module 424 may identify one or more alternate timeslots in response to a request for alternate timeslots for a meeting. For example, timeslot analysis module 420 may send a request to alternate timeslot module 424 for one or more alternate timeslots for a meeting upon determining that not all attendees are likely to join the meeting. The request may include information about the meeting (e.g., the request may include the meeting details). Alternatively, the request may identify the meeting and alternate timeslot module 424 can retrieve the meeting details from calendaring service 428.

In some embodiments, alternate timeslot module 424 can identify alternate timeslots for a meeting based on a predetermined time interval for identifying an alternate timeslot. The predetermined time interval may be configured as part of an organizational policy. For example, suppose an original timeslot for a meeting is 3:00 pm to 4:00 pm on Monday, Jul. 18, 2022. Also suppose that the predetermined time interval is defined to be a day. In this example case, alternate timeslot module 424 can check to determine whether the same timeslot, e.g., 3:00 pm to 4:00 pm, on Tuesday, Jul. 19, 2022, is an alternate timeslot for the meeting. A timeslot can be identified as an alternate timeslot if all attendees of the meeting are able to join the meeting if scheduled for that timeslot. Alternate timeslot module 424 can continue checking the same timeslot on the succeeding days to identify alternate timeslots for the meeting. As another example, in the above example, suppose that the predetermined time interval is defined to be a week. In this example case, alternate timeslot module 424 can check to determine whether the same timeslot, e.g., 3:00 pm to 4:00 pm on Monday, the following week is an alternate timeslot for the meeting. Alternate timeslot module 424 can continue checking the same timeslot (e.g., 3:00 pm to 4:00 pm on Monday) on the succeeding weeks to identify alternate timeslots for the meeting. The number of attempts to identify an alternate timeslot may be limited to reduce storage and/or processing resources (e.g., at most N attempts may be made to identify an alternate timeslot, where the value of N may be configured as part of an organizational policy).

FIG. 5 is a diagram showing an example of a user interface (UI) 500 that may be used to present information about meetings scheduled by a meeting organizer, in accordance with an embodiment of the present disclosure. Illustrative UI 500 may be implemented within system 400 if FIG. 4 and, more particularly, within client application 406 of FIG. 4. For example, UI 500 may be used to present up-to-date acceptance level information about scheduled meetings of a meeting organizer who has enabled a track my meetings feature.

As shown in FIG. 5, illustrative UI 500 can display the meetings that are scheduled by the meeting organizer. In one arrangement, the meeting may be organized or grouped according to the days on which the individual meetings are scheduled for. In the example of FIG. 5, the meeting organizer may have four meetings scheduled on 25 Apr. 2022, four meetings scheduled on 26 Apr. 2022, four meetings scheduled on 27 Apr. 2022, and four meetings scheduled on 28 Apr. 2022. More specifically, on 25 Apr. 2022, a meeting entitled "Project Priority" may be scheduled for the timeslot 2:00 pm to 2:30 pm, a meeting entitled "Stack Holder Priority" may be scheduled for the timeslot 2:30 pm to 3:30 pm, a meeting entitled "Status Meeting" may be scheduled for the timeslot 4:00 pm to 5:00 pm, and a meeting entitled "Tex—Scheduled" may be scheduled for the timeslot 5:30 pm to 6:30 pm. On 26 Apr. 2022, a meeting entitled "Moon Shot—Solution—1" may be scheduled for the timeslot 2:00 pm to 2:30 pm, a meeting entitled "Staff Meeting" may be scheduled for the timeslot 2:30 pm to 3:30 pm, a meeting entitled "Sprint Planning" may be scheduled for the timeslot 4:00 pm to 5:00 pm, and a meeting entitled "Environment Readiness" may be scheduled for the timeslot 5:30 pm to 6:30 pm. The other two days, 27 Apr. 2022 and 28 Apr. 2022, may also have meetings with respective meeting titles scheduled for respective timeslots as shown in FIG. 5.

Illustrative UI 500 can display a status bar 502 or other icon for each displayed meeting. The displayed status bar may be color coded to indicate the acceptance level of the corresponding meeting. For example, a portion of the status bar may be displayed in a first color (e.g., green) to indicate the percentage of the attendees that are likely to join the meeting, a portion of the status bar may be displayed in a second color (e.g., yellow) to indicate the percentage of the attendees that may or may not join the meeting, and a portion of the status bar may be displayed in a third color (e.g., red) to indicate the percentage of the attendees that are not likely to join the meeting. As an example, if all six attendees of a meeting are likely to join the meeting, a status bar 502 for this meeting can be displayed in green. As another example, if three of the six attendees of a meeting are likely to join the meeting and the other three attendees are not likely to join the meeting, one half of a status bar 502 for this meeting can be displayed in green and the other half of status bar 502 for this meeting can be displayed in red. As still another example, if all four attendees of a meeting are not likely to join the meeting, a status bar 502 for this meeting can be displayed in red. As yet another example, suppose two of four attendees of a meeting are likely to join the meeting, one attendee may or may not join the meeting, and one attendee is not likely to join the meeting. In this example case, one half of a status bar 502 for this meeting can be displayed in green, one quarter of status bar 502 for this meeting can be displayed in yellow, and the remaining one quarter of status bar 502 for this meeting can be displayed in red.

Illustrative UI 500 can display a "View Details" UI element 504 for each displayed meeting. UI element 504 (e.g., a button) can be used to obtain additional details regarding the corresponding meeting including details of the acceptance level of the meeting. For example, in response to a user clicking/tapping UI element 504 corresponding to a meeting, UI 500 can cause another UI to be rendered/displayed which displays the additional details, such as the attendees who are out of office, the attendees that have conflicts (e.g., a hard conflict or a tentative conflict), attendees that are likely to join, attendees that may or may not join, attendees that are not likely to join, and one or more alternate timeslots, among other information about the meeting.

Figure 6:
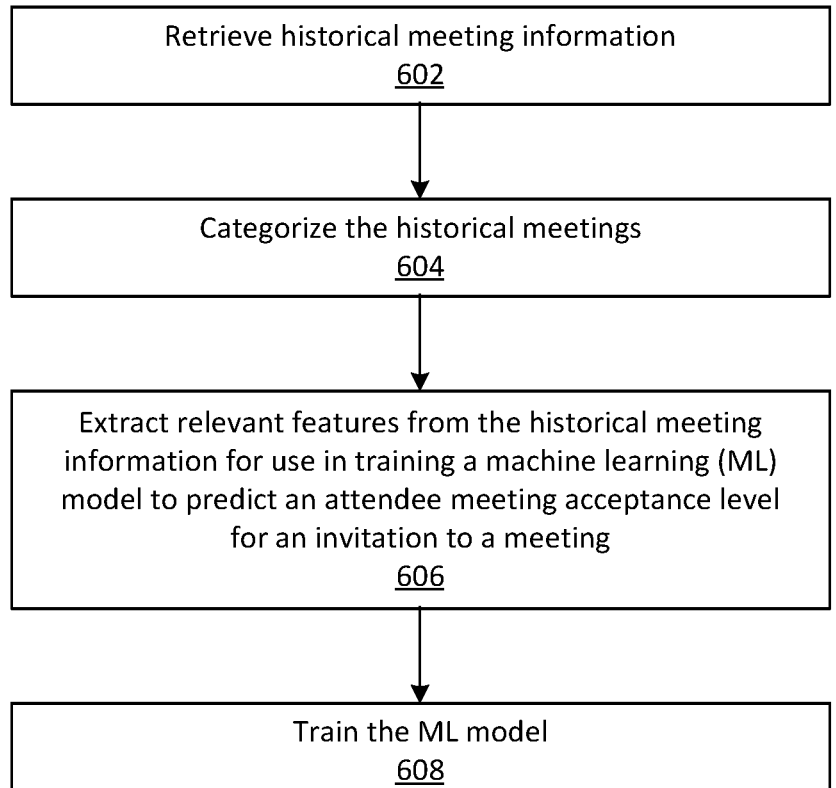
FIG. 6 is a flow diagram of an example process for building a machine learning (ML) model to predict attendee meeting acceptance level for an invitation to a meeting, in accordance with an embodiment of the present disclosure.

FIG. 6 is a flow diagram of an example process 600 for building a machine learning (ML) model to predict attendee meeting acceptance level for an invitation to a meeting, in accordance with an embodiment of the present disclosure. Illustrative process 600 may be implemented within attendee acceptance module 418 of FIG. 4.

With reference to process 600 of FIG. 6, at 602, information about historical meetings (historical meeting information) may be retrieved. The historical meeting information may be determined from calendar details of individual users associated with an organization. The calendaring details of the users may be retrieved from a calendaring service (e.g., calendaring service 428) utilized by the organization.

At 604, the historical meeting may be categorized. For example, the subject (e.g., title) of the individual historical meetings can be classified to categorize the historical meetings. In some embodiments, a multinomial Naive Bayes classifier with Term Frequency-Inverse Document Frequency (TF-IDF) may be utilized to classify the text of the subject of the individual historical meetings.

At 606, relevant features may be extracted from the historical meeting information for training a machine learning (ML) model to predict an attendee meeting acceptance level for an invitation to a meeting. For example, feature engineering can be used to extract and select the relevant features from the historical meeting information that are highly corelated with the thing being predicted by the generated ML model (e.g., the relevant features influence prediction of an attendee meeting acceptance level). Non-limiting examples of such features include attendee, subject category, organizer, date of the meeting, and time of the meeting.

At 608, the ML model may be trained. For example, a decision tree-based algorithm, such as a random forest algorithm, can be trained for classification using the relevant features extracted at 606. Once trained, the trained ML model (e.g., random forest classifier) can predict an attendee meeting acceptance level for an invitation to a meeting.

FIG. 7 is a flow diagram of an example process 700 for analyzing a timeslot of a meeting, in accordance with an embodiment of the present disclosure. Illustrative process 700 may be implemented, for example, within system 400 of FIG. 4. In more detail, process 700 may be performed, for example, in whole or in part by attendee acceptance module 418, timeslot analysis module 420, and alternate timeslot module 424, or any combination of these including other components of system 400 described with respect to FIG. 4.

With reference to process 700 of FIG. 7, at 702, a request to analyze a timeslot of a meeting may be received. The request for analysis of the timeslot of the meeting may be from a client application (e.g., client application 406) on a client device (e.g., client 402) and/or another component (e.g., new meeting analysis module 422) of intelligent meeting timeslot service 408. The request may be to analyze a timeslot of a new meeting (e.g., a new meeting that is yet to be scheduled) or an existing meeting (e.g., a meeting that is already scheduled).

At 704, details of the meeting may be determined. Such details may include an organizer of the meeting, a subject of the meeting, a start date and time and an end date and time (a timeslot) of the meeting, and one or more attendees of the meeting. The meetings details may be included with the request or may be retrieved from data repository 426.

At 706, an attendee meeting acceptance level may be determined for each attendee of the meeting. If the analysis is for a new meeting, attendee acceptance module 418 can be utilized to predict or otherwise determine attendee meeting acceptance levels for the attendees. If the analysis is for an existing meeting, attendee meeting acceptance levels of the attendees can be retrieved from data repository 426. Note that the attendee meeting acceptance levels of the attendees of existing meetings may have been previously predicted and stored within data repository 426.

At 708, an acceptance level of the meeting may be determined based on the likelihood of the attendees joining the meeting. Likelihood of the attendees joining the meeting may be determined from the attendee meeting acceptance levels of the attendees and prior commitments of the attendees for the timeslot that is being analyzed. The acceptance level of the meeting may indicate the attendees that are likely to join the meeting scheduled for the timeslot, the attendees that may or may not join the meeting scheduled for the timeslot, and the attendees that are not likely to join the meeting scheduled for the timeslot. In some embodiments, the acceptance level of the meeting may be based on the meeting acceptance scores of the attendees.

At 710, one or more alternate timeslots for the meeting may be optionally determined. For example, if the acceptance level of the meeting indicates that not all attendees are likely to join the meeting scheduled for the timeslot, one or more alternate timeslots for the meeting may be determined and suggested as suitable timeslots for scheduling the meeting.

At 712, information about the acceptance level of the meeting may be sent in a response to the request to analyze the timeslot of the meeting. The information may include information about the alternate timeslots determined for the meeting.

Figure 8:
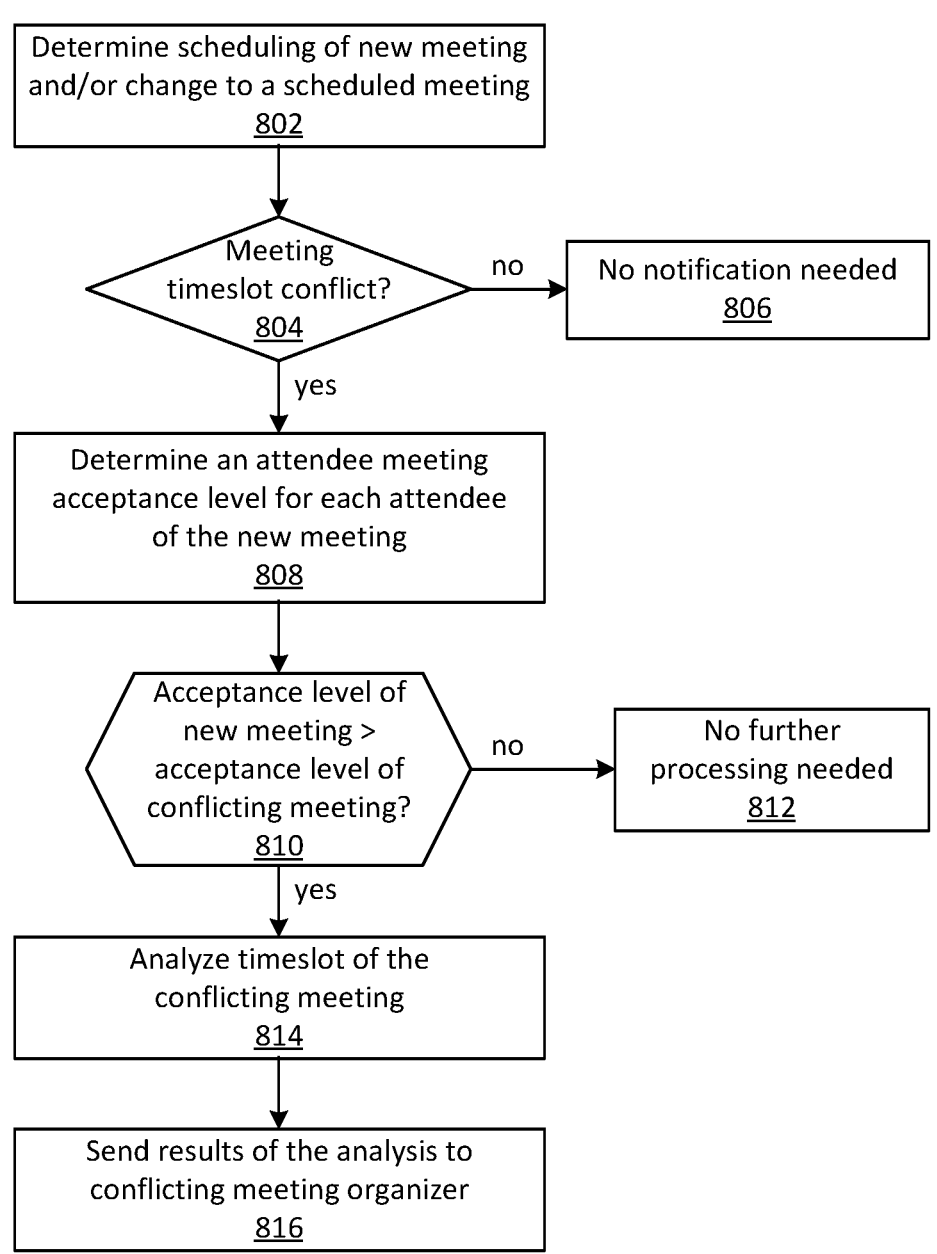
FIG. 8 is a flow diagram of an example process for analyzing calendars of users associated with an organization and informing meeting organizers of changes to their meetings, in accordance with an embodiment of the present disclosure.

FIG. 8 is a flow diagram of an example process 800 for analyzing calendars of users associated with an organization and informing meeting organizers of changes to their meetings, in accordance with an embodiment of the present disclosure. Illustrative process 800 may be implemented, for example, within system 400 of FIG. 4. In more detail, process 800 may be performed, for example, in whole or in part by attendee acceptance module 418, timeslot analysis module 420, new meeting analysis module 422, and alternate timeslot module 424, or any combination of these including other components of system 400 described with respect to FIG. 4.

With reference to process 800 of FIG. 8, at 802, a scheduling of a new meeting and/or a change to a scheduled meeting may be determined. For purposes of this discussion, a change to a scheduled meeting can be understood to be the same as a scheduling of a new meeting. For example, a user (e.g., a meeting organizer) may have enabled a track my meetings feature of intelligent meeting timeslot service 408. In response to enablement of this feature, a calendaring service being utilized by the organization (e.g., calendaring service 428) may be monitored to detect scheduling of new meetings.

At 804, a check may be performed to determine whether a timeslot of the new meeting conflicts with a timeslot of an existing meeting. If it is determined that there is no conflict between the timeslot of the new meeting and a timeslot of any existing meeting, then, at 806, it may be determined that no notification is needed since the scheduling of the new meeting does not impact any existing meeting.

Otherwise, if, at 804, it is determined that there is a conflict between the timeslot of the new meeting and a timeslot of an existing meeting, then at 808, an attendee meeting acceptance level may be determined for each attendee of the new meeting. Attendee acceptance module 418 can be utilized to predict or otherwise determine attendee meeting acceptance levels for the attendees. An acceptance level of the new meeting may then be determined based on the attendee meeting acceptance levels of the attendees and prior commitments of the attendees for the timeslot of the new meeting. Timeslot analysis module 420 can be utilized to determine the acceptance level of the new meeting.

At 810, a check may be performed to determine whether the acceptance level of the new meeting is higher than the acceptance level of the conflicting meeting. Here, the conflicting meeting is the existing meeting determined at 804 as having a conflict with the new meeting. If it is determined that the acceptance level of the new meeting is not higher than the acceptance level of the conflicting meeting, then, at 812, it may be determined that no further processing is needed since the scheduling of the new meeting has no impact on the conflicting meeting. In some implementations, process 800 may then check for timeslot conflicts with other existing meetings at 804.

Otherwise, if, at 810, it is determined that the acceptance level of the new meeting is higher than the acceptance level of the conflicting meeting, then the timeslot of the conflicting meeting may be analyzed since the scheduling of the new meeting may impact the conflicting meeting. For example, the scheduling of the new meeting may impact the meeting preferences of the attendees of the conflicting meeting. At 814, the timeslot of the conflicting meeting may be analyzed. Timeslot analysis module 420 can be utilized to analyze the the timeslot of the conflicting meeting.

At 816, results of the analysis of the timeslot of the conflicting meeting may be sent or otherwise provided to the organizer of the conflicting meeting. The results may include information about the acceptance level of the conflicting meeting. In some embodiments, the results may be provided to the meeting organizer if the meeting organizer has enabled the track my meetings feature of intelligent meeting timeslot service 408.

Figure 9:
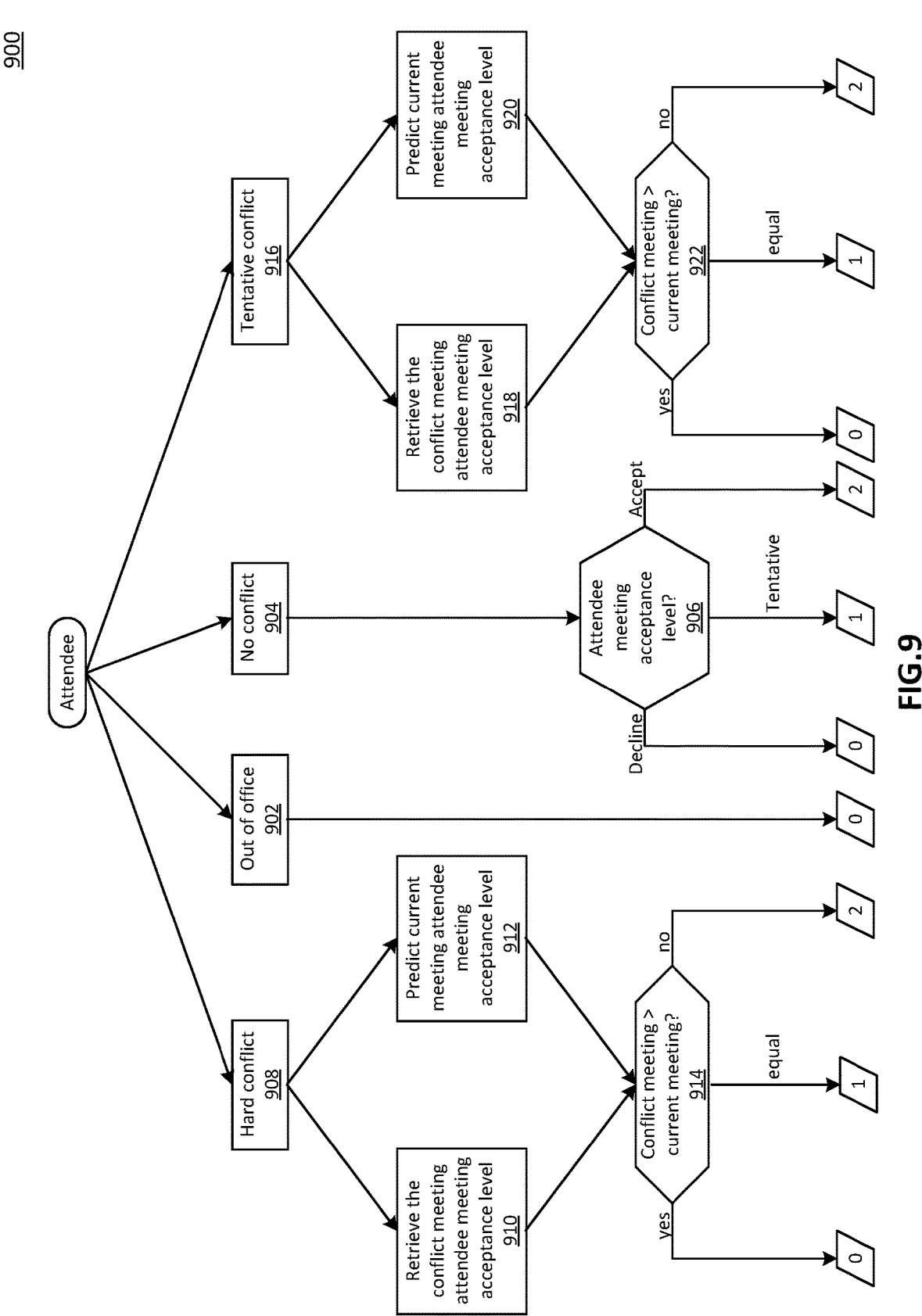
FIG. 9 is a flow diagram of an example process for assigning a meeting acceptance score to an attendee, in accordance with an embodiment of the present disclosure.

FIG. 9 is a flow diagram of an example process 900 for assigning a meeting acceptance score to an attendee, in accordance with an embodiment of the present disclosure. Illustrative process 900 may be implemented within timeslot analysis module 420 of FIG. 4.

With reference to process 900 of FIG. 9, for purposes of this discussion, the attendee may be an attendee of a meeting scheduled for a timeslot and the assigned meeting acceptance score represents a likelihood of the attendee accepting an invitation to the meeting. To assign a meeting acceptance score to the attendee, the attendee's calendar can be checked to determine if the attendee is out of office (e.g., not available for meetings) during the timeslot for which the meeting is scheduled. If the attendee is out of office at that time (see reference numeral 902 in FIG. 9), the attendee can be assigned a meeting acceptance score of 0. A value of 0 for the meeting acceptance score may indicate that the attendee is not likely to join the meeting scheduled for that timeslot.

If the attendee is not out of office, the attendee's calendar can be checked to determine whether the attendee has no conflict, a hard conflict, or a tentative conflict for the timeslot for which the meeting is scheduled. If the attendee has no conflict (see reference numeral 904 in FIG. 9), a meeting acceptance score can be assigned based on the attendee's attendee meeting acceptance level for the invitation to the meeting (see reference numeral 906 in FIG. 9). If the attendee meeting acceptance level is that the attendee is likely to decline the initiation to the meeting, the attendee can be assigned a meeting acceptance score of 0. If the attendee meeting acceptance level is that the attendee is likely to tentatively accept the initiation to the meeting, the attendee can be assigned a meeting acceptance score of 1. A value of 1 for the meeting acceptance score may indicate that the attendee may or may not join the meeting scheduled for that timeslot. If the attendee meeting acceptance level is that the attendee is likely to accept the initiation to the meeting, the attendee can be assigned a meeting acceptance score of 2. A value of 2 for the meeting acceptance score may indicate that the attendee is likely to join the meeting scheduled for that timeslot.

If there is a hard conflict with another meeting (e.g., attendee has accepted an invite to another meeting scheduled for the same timeslot) (see reference numeral 908 in FIG. 9), a meeting acceptance score can be assigned based on the attendee's attendee meeting acceptance levels for this meeting (i.e., the current meeting) and the conflicting meeting. The attendee's attendee meeting acceptance level for the conflicting meeting can be retrieved from data repository 426 (see reference numeral 908 in FIG. 9). The attendee's attendee meeting acceptance level for the current meeting can be predicted using attendee acceptance module 418 (see reference numeral 910 in FIG. 9). A meeting acceptance score can then be assigned based on a comparison of the attendee's attendee meeting acceptance levels for the current meeting and the conflicting meeting (see reference numeral 914 in FIG. 9). If the attendee's attendee meeting acceptance level for the conflicting meeting is higher than the attendee's attendee meeting acceptance level for the current meeting, the attendee can be assigned a meeting acceptance score of 0. If the attendee's attendee meeting acceptance level for the conflicting meeting is the same as the attendee's attendee meeting acceptance level for the current meeting, the attendee can be assigned a meeting acceptance score of 1. If the attendee's attendee meeting acceptance level for the current meeting is higher than the attendee's attendee meeting acceptance level for the conflicting meeting, the attendee can be assigned a meeting acceptance score of 2.

If there is a tentative conflict with another meeting (e.g., attendee has tentatively accepted an invite to another meeting scheduled for the same timeslot) (see reference numeral 916 in FIG. 9), a meeting acceptance score can be assigned based on the attendee's attendee meeting acceptance levels for the current meeting and the conflicting meeting. The attendee's attendee meeting acceptance level for the conflicting meeting can be retrieved from data repository 426 (see reference numeral 918 in FIG. 9). The attendee's attendee meeting acceptance level for the current meeting can be predicted using attendee acceptance module 418 (see reference numeral 920 in FIG. 9). A meeting acceptance score can then be assigned based on a comparison of the attendee's attendee meeting acceptance levels for the current meeting and the conflicting meeting (see reference numeral 920 in FIG. 9). If the attendee's attendee meeting acceptance level for the conflicting meeting is higher than the attendee's attendee meeting acceptance level for the current meeting, the attendee can be assigned a meeting acceptance score of 0. If the attendee's attendee meeting acceptance level for the conflicting meeting is the same as the attendee's attendee meeting acceptance level for the current meeting, the attendee can be assigned a meeting acceptance score of 1. If the attendee's attendee meeting acceptance level for the current meeting is higher than the attendee's attendee meeting acceptance level for the conflicting meeting, the attendee can be assigned a meeting acceptance score of 2.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:

providing, by a computing device, a representational state transfer (REST) API interface to a calendaring service and a second API interface to a client application;

continuously retrieving, by the computing device, calendar details of one or more users from the calendaring service through the REST interface;

generating from the calendar details, by the computing device, a training dataset comprising a plurality of training samples, each training sample of the plurality of training samples comprising a plurality of relevant features from historical meeting information, the plurality of relevant features indicating an attendee of a historical meeting, an organizer of the historical meeting, a date of the historical meeting, a time of the historical meeting, and a subject category of the historical meeting, wherein the plurality of relevant features influence a prediction of an attendee meeting acceptance level;

training, by the computing device, a machine learning (ML) model to predict an attendee meeting acceptance level for an invitation to a meeting using the training dataset, wherein training the ML model includes inputting the plurality of training samples to the ML model;

receiving, by the computing device, via the second API interface a request to analyze a timeslot of a meeting;

determining, by the computing device, meeting details, wherein the meeting details include an organizer of the meeting, a date of the meeting, a time of the meeting, a subject of the meeting, and one or more attendees of the meeting;

predicting, by the computing device using the ML model, an attendee meeting acceptance level for each attendee of the one or more attendees, the attendee meeting acceptance level based on a likelihood of the one or more attendees joining the meeting;

aggregating, by the computing device, the attendee meeting acceptance levels for each attendee;

determining, by the computing device, from the aggregated attendee meeting acceptance levels an acceptance level of the meeting;

generating, by the computing device, a status bar indicative of one or more aggregated acceptance levels of the meeting and the meeting acceptance level;

providing, by the computing device, a user-interface to the client device over the second API interface, the user-interface configured to display the status bar and the meeting acceptance level of the meeting in a response to the request to analyze the timeslot of the meeting; and pushing in real-time updates over the second API interface, by the computing device, to the user-interface based on the continuously retrieved calendar details.

2. The method of claim 1, wherein the likelihood of the one or more attendees joining the meeting is based at least on prior commitments of the one or more attendees for the timeslot.

3. The method of claim 1, wherein the subject category of the historical meeting is determined using a second ML model comprising a multinomial Naive Bayes classifier with Term Frequency-Inverse Document Frequency (TF-IDF) to classify text of a subject of the historical meeting.

4. The method of claim 1, wherein the ML model includes a random forest classifier.

5. The method of claim 1, further comprising:
determining one or more alternate timeslot for the meeting; and
including information about the one or more alternate timeslots in the response to the request to analyze the timeslot of the meeting.

6. The method of claim 1, wherein the acceptance level of the meeting indicates the one or more attendees that are out of office.

7. The method of claim 1, further comprising:
determining from the acceptance level of the meeting a conflicting meeting;
determine an acceptance level of the conflicting meeting;
comparing the acceptance level of the meeting with the acceptance level of the conflicting meeting;
update the acceptance level of the conflicting meeting if the acceptance level of the meeting exceeds the acceptance level of the conflicting meeting; and
update the user-interface of an organizer of the conflicting meeting with the updated acceptance level of the conflicting meeting.

8. The method of claim 1, wherein the acceptance level of the meeting indicates the one or more attendees that are likely to join the meeting.

9. The method of claim 1, wherein the acceptance level of the meeting indicates the one or more attendees that may or may not join the meeting.

10. The method of claim 1, wherein the acceptance level of the meeting indicates the one or more attendees that are not likely to join the meeting.

11. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
providing a representational state transfer (REST) API interface to a calendaring service and a second API interface to a client application;
continuously retrieving calendar details of one or more users from the calendaring service through the REST interface;
generating from the calendar details a training dataset comprising a plurality of training samples, each training sample of the plurality of training samples comprising a plurality of relevant features from historical meeting information, the plurality of relevant features indicating an attendee of a historical meeting, an organizer of the historical meeting, a date of the historical meeting, a time of the historical meeting, and a subject category of the historical meeting, wherein the plurality of relevant features influence a prediction of an attendee meeting acceptance level;
training a machine learning (ML) model to predict an attendee meeting acceptance level for an invitation to a meeting using the training dataset, wherein training the ML model includes inputting the plurality of training samples to the ML model;
receiving via the second API interface a request to analyze a timeslot of a meeting;
determining meeting details, wherein the meeting details include an organizer of the meeting, a date of the meeting, a time of the meeting, a subject of the meeting, and one or more attendees of the meeting;
predicting, using the ML model, an attendee meeting acceptance level for each attendee of the one or more attendees, the attendee meeting acceptance level based on a likelihood of the one or more attendees joining the meeting;
aggregating the attendee meeting acceptance levels for each attendee;
determining from the aggregated attendee meeting acceptance levels an acceptance level of the meeting;
generating status bar indicative of one or more aggregated acceptance levels of the meeting and the meeting acceptance level;
providing a user-interface to the client device over the second API interface, the user-interface configured to display the status bar and the meeting acceptance level of the meeting in a response to the request to analyze the timeslot of the meeting; and
pushing in real-time updates over the second API interface to the user-interface based on the continuously retrieved calendar details.

12. The system of claim 11, wherein the likelihood of the one or more attendees joining the meeting is based at least on prior commitments of the one or more attendees for the timeslot.

13. The system of claim 11, wherein the subject category of the historical meeting is determined using a second ML model comprising a multinomial Naive Bayes classifier with Term Frequency-Inverse Document Frequency (TF-IDF) to classify text of a subject of the historical meeting.

14. The system of claim 11, wherein the ML model includes a random forest classifier.

15. The system of claim 11, wherein the process further comprises:
determining one or more alternate timeslot for the meeting; and
including information about the one or more alternate timeslots in the response to the request to analyze the timeslot of the meeting.

16. A non-transitory machine-readable medium encoding instructions that when executed by one or more processors cause a process to be carried out, the process including:
providing a representational state transfer (REST) API interface to a calendaring service and a second API interface to a client application;
continuously retrieving calendar details of one or more users from the calendaring service through the REST interface;
generating from the calendar details a training dataset comprising a plurality of training samples, each training sample of the plurality of training samples comprising a plurality of relevant features from historical meeting information, the plurality of relevant features indicating an attendee of a historical meeting, an organizer of the historical meeting, a date of the historical meeting, a time of the historical meeting, and a subject category of the historical meeting, wherein the plurality of relevant features influence a prediction of an attendee meeting acceptance level;

training a machine learning (ML) model to predict an attendee meeting acceptance level for an invitation to a meeting using the training dataset, wherein training the ML model includes inputting the plurality of training samples to the ML model;

receiving via the second API interface a request to analyze a timeslot of a meeting;

determining meeting details, wherein the meeting details include an organizer of the meeting, a date of the meeting, a time of the meeting, a subject of the meeting, and one or more attendees of the meeting;

predicting, using the ML model, an attendee meeting acceptance level for each attendee of the one or more attendees, the attendee meeting acceptance level based on a likelihood of the one or more attendees joining the meeting;

aggregating the attendee meeting acceptance levels for each attendee;

determining from the aggregate attendee meeting acceptance levels an acceptance level of the meeting;

generating a status bar indicative of one or more aggregated acceptance levels of the meeting and the meeting acceptance level;

providing a user-interface to the client device over the second API interface, the user-interface configured to display the status bar and the meeting acceptance level of the meeting in a response to the request to analyze the timeslot of the meeting; and pushing in real-time updates over the second API interface to the user-interface based on the continuously retrieved calendar details.

17. The machine-readable medium of claim 16, wherein the likelihood of the one or more attendees joining the meeting is based at least on prior commitments of the one or more attendees for the timeslot.

18. The machine-readable medium of claim 16, wherein the subject category of the historical meeting is determined using a second ML model comprising a multinomial Naive Bayes classifier with Term Frequency-Inverse Document Frequency (TF-IDF) to classify text of a subject of the historical meeting.

19. The machine-readable medium of claim 16, wherein the ML model includes a random forest classifier.

20. The machine-readable medium of claim 16, wherein the process further comprises:

determining one or more alternate timeslot for the meeting; and including information about the one or more alternate timeslots in the response to the request to analyze the timeslot of the meeting.

* * * * *